United States Patent [19]
Jordan

[11] Patent Number: 5,547,098
[45] Date of Patent: *Aug. 20, 1996

[54] CONTAINER WITH STACKABLE TRAYS AND ADJUSTABLE PARTITIONS

[76] Inventor: Raymond L. Jordan, 2875 Idlewild Dr., #58, Reno, Nev. 89509

[ * ] Notice: The term of this patent shall not extend beyond the expiration date of Pat. No. 5,386,922.

[21] Appl. No.: 348,260

[22] Filed: Nov. 28, 1994

Related U.S. Application Data

[63] Continuation-in-part of Ser. No. 122,297, Sep. 17, 1993, Pat. No. 5,386,922.

[51] Int. Cl.$^6$ .................................................. B65D 21/02
[52] U.S. Cl. .................................. 220/23.86; 220/23.83; 220/528; 220/533; 206/373; 206/514
[58] Field of Search .................................. 220/533, 532, 220/4.27, 23.4, 23.6, 23.83, 23.86, 503, 505, 507, 524, 528, 529, 408, 410; 206/514, 501, 503, 504, 508, 373, 372

[56] References Cited

U.S. PATENT DOCUMENTS

| | | |
|---|---|---|
| D. 325,281 | 4/1992 | Jordan . |
| 1,277,253 | 8/1918 | Paschal . |
| 1,750,258 | 3/1930 | Brown . |
| 1,760,761 | 5/1930 | March . |
| 1,977,092 | 10/1934 | Scurlock . |
| 2,292,499 | 8/1942 | Walsh . |
| 2,919,169 | 12/1959 | Jackson . |
| 2,980,280 | 4/1961 | Herlow . |
| 3,117,692 | 1/1964 | Carpenter et al. . |
| 3,398,827 | 8/1968 | Laskin . |
| 3,749,278 | 7/1973 | von Boch-Galhau . |
| 3,751,845 | 8/1973 | van Leeuwen . |
| 4,580,679 | 4/1986 | Hellman, III ........................... 220/533 |
| 4,619,363 | 10/1986 | Wolfseder . |
| 4,756,412 | 7/1988 | Graves et al. . |
| 4,911,295 | 3/1990 | Venegoni . |
| 5,011,013 | 4/1991 | Meisner et al. ........................ 206/373 |
| 5,044,537 | 9/1991 | Bufalo . |
| 5,052,580 | 10/1991 | Khoury ................................. 220/505 |
| 5,062,539 | 11/1991 | Chandler . |
| 5,117,979 | 6/1992 | Brightbill ............................... 206/503 |
| 5,154,303 | 10/1992 | Jordan . |
| 5,255,816 | 10/1993 | Trepp ................................... 220/4.27 |
| 5,386,922 | 2/1995 | Jordan .................................. 220/505 |
| 5,392,901 | 2/1995 | Kuray et al. .......................... 220/528 |

FOREIGN PATENT DOCUMENTS 874923 8/1942 France .

*Primary Examiner*—Stephen J. Castellano
*Attorney, Agent, or Firm*—Richard C. Litman

[57] ABSTRACT

A system of trays and inserts placed in each tray is disclosed, for converting a bucket to an organized receptacle for storing and dispensing small parts or objects. Trays are circular, and are stacked within the bucket. Each tray has low partitions, dividing the tray into pie slice segments. An insert is placed in each segment. Inserts have constricted necks, enabling them to be grasped readily by the fingers of a user, even when the insert is filled with small objects. An individual tray is thereby readily removable, even if filled with small parts, independently of neighboring inserts. Inserts are optionally provided with tightly fitting caps. Both trays and inserts are provided in variable vertical dimensions. Two short inserts or trays occupy the same height within the bucket, as a single tall insert or tray. Alternative trays include removably installable, radially disposed partitions therein, providing for variable volume for the various areas of the tray(s). All of the partitions may be removed from such a tray, thereby providing for the storage of coiled elongate articles therein. Thus, the bucket is selectively reconfigurable to provide a desired combination of inserts and trays.

20 Claims, 4 Drawing Sheets

CONTAINER WITH STACKABLE TRAYS AND ADJUSTABLE PARTITIONS

REFERENCE TO RELATED PATIENT APPLICATION

This patent application is a continuation in part of U.S. patent application Ser. No. 08/122,297, filed on Sep. 17, 1993 now U.S. Pat. No. 5,386,922 and allowed on Sep. 12, 1994.

BACKGROUND OF THE INVENTION

1. Field of the Invention

The present invention relates to trays placed in a bucket or like container and separate, removable compartmented inserts removably installable in those trays. At least some of the trays may include movable or removable partitions therein, providing for the customizing of the interior space within such trays. The trays, inserts, and adjustable partitions provide for the conversion of a general utility bucket into an organized container for small parts and other articles.

2. Description of the Prior Art

In manufacturing, assembling, and construction of buildings, it is frequently necessary to maintain at hand a selection of fasteners, small parts, and like items. These items must be separated into collections of like objects, so that a user retrieves one such object, and spends little time verifying that he or she has retrieved the correct item. Storing a variety of such small parts or objects, and making the same readily available for retrieval has been the subject of prior art patents.

The present applicant has developed a system of stackable trays which when placed in a general utility bucket, provides a person with an inexpensive, rugged, practical means of storing and organizing small parts. This system is seen in U.S. Pat. Nos. D325,281, issued on Apr. 7, 1992, and 5,154,303, issued on Oct. 13, 1992. Each tray overlies its predecessor, and is divided into plural compartments.

Another system of trays for organizing a bucket is seen in U.S. Pat. No. 4,911,925, issued Mar. 27, 1990 to Daniel E. Venegoni. Venegoni '295 discloses a series of vertically stacked trays, each subdivided into compartments. However, the Venegoni structure is unlike that of the present invention as recited in the accompanying claims.

The above devices of the present applicant and of Venegoni '295 share a feature in these patents, each tray has an open center with a strap or handle straddling the opening. Each tray is readily grasped and removed by the strap or handle.

The relevant art cited above explicitly cooperates with buckets for conversion to organized storage receptacles, which is an object of the present invention. There are other known arrangements providing compartmentalized, vertically stacked trays for receptacles, such as those shown in U. S. Pat. Nos. 2,919,169, issued to Carl A. Jackson on Dec. 29, 1959, and 3,751,845, issued to Marion van Leeuwen on Aug. 14, 1973.

Vertically stacked trays for organizing a receptacle are further seen in U.S. Pat. Nos. 2,292,499, issued to William Walsh on Aug. 11, 1942 and 5 062,539, issued to John W Chandler on Nov. 5, 1991.

Compartmentalizing a tray is seen in U. S. Pat. Nos. 1,750,258, issued to Donald D. Brown on Mar. 11, 1930, and 5,044,537, issued to Jeffery P. Bufalo on Sep. 3, 1991.

Separate, complementary, pie slice shaped compartments for organizing a single level of a receptacle are exemplified in U. S. Pat. No. 1,760,761, issued to Carl March on May 27, 1930.

In addition to the above patents and/or prior art documents, applicant is aware of the following patents which were provided in an Office Action issued during the prosecution of the parent application to the present continuation in part patent application.

U. S. Pat. No. 1,277,253 issued to David N. Paschal on Aug. 27, 1918 discloses a Cooking Utensil having a single tier of removable inserts with radially projecting handles, precluding complete insertion into another container.

U. S. Pat. No. 1,977,092 issued to Lewis H. Scurlock on Oct. 16, 1934 discloses a Food Container Unit having a plurality of radially removable containers on a revolving base. The containers are not vertically stacked atop one another.

U.S. Pat. No. 2,980,280 issued to Erik Herlow on Apr. 18, 1961 discloses a Hollow Ware Service Set comprising a plurality of nesting containers each having a different diameter. Removal of all preceding containers is required to remove one of the containers.

U. S. Pat. No. 3,117,692 issued to Robert L. Carpenter et al. on Jan. 4, 1964 discloses a Container And Lid Assembly in which a plurality of containers are stacked atop the lids of one another, and are not enclosed within an outer container, as in the present invention.

U.S. Pat. No. 3,398,827 issued to Maurie Laskin on Aug. 27, 1968 discloses Trays, And Multi-Tray Packages including a bottom plate having a rod extending vertically upward therefrom. The trays must be stacked over the central rod, unlike the present invention.

U.S. Pat. No. 3,749,278 issued to Marie H. I. A. von Boch-Galhau on Jul. 31, 1973 discloses a Set Of Different Dinner-Ware Articles which fit or nest together. In most of the various embodiments, the articles are of different diameters, and even in one configuration wherein the central articles have the same diameter, the top and bottom articles are of different diameter. None of the articles are compartmented, as in the present invention.

U.S. Pat. No. 4,619,363 issued to Alfred Wolfseder on Oct. 28, 1986 discloses a Multiple Tray-Shaped Packing And Storage Unit in which various containers are stacked atop one another and interlock, thus removing requirement for an outer container or bucket, as provided by the present invention.

U.S. Pat. No. 4,756,412 issued to Don Graves on Jul. 12, 1988 discloses a Fishing Tackle Box including concentric revolving compartmented units, with a sliding drawer therebeneath.

Finally, French Patent Publication No. 874,923 to Vereinigte Lausitzer Glaswerke Aktienagsellschaft and published on Aug. 31, 1942 discloses a group of receptacles for use with refrigerators. A plurality of generally rectangular containers and lids generally each of different dimensions, are provided. The containers or trays are not of uniform size and configuration, as provided by the present invention.

None of the above noted patents, taken either singly or in combination, are seen to disclose the specific arrangement of concepts disclosed by the present invention.

SUMMARY OF THE INVENTION

The present invention relates to an improvement over applicant's U. S. Pat. Nos. D325,281 and 5,154,303. In this improvement, readily removable inserts are provided for each tray. These inserts may include optional tightly fitting covers or caps.

Both the trays and inserts are modular, being provided in several sizes with respect to height of each tray or insert. A tray is provided with one tall or two short inserts. Either possibility results in a single or combined height approaching the height of the tray. In like manner, trays are of the tall or short variety, two short trays combining to equal the height of a single tall tray.

Trays are circular, conforming to the configuration of the bucket. The trays have low partitions which stabilize the inserts placed in each tray. The inserts are configured in the manner of pie slices, each occupying one fourth of the tray area between adjacent partitions. Inserts have constricted portions, which enable a user to grasp the insert with his or her fingers. This arrangement enables grasping of an insert even when it is full of parts. This avoids interference which would ensue if the grasping means comprised a handle or the like spanning the receptacle portion of an insert filled with objects. This arrangement also obviates the necessity of removing an entire tray to remove a single insert.

I addition to the above features of the present invention, removably installable radially disposed partitions are provided in at least one of the stackable trays, thus providing further utility by allowing for the adjustment of the volume of the various compartments divided by such removable partitions. Any number or all of the partitions may be removed, if desired, so that a single tray may be used to contain a single type of object, or so that an elongate object (e.g., electrical cord, plumb line, etc.) may be coiled within the partitionless tray, if desired.

Thus the present invention provides a bucket vertically divided into many tiers, each tier being horizontally subdivided into one or more compartments. Tier height and tier subdivision are selectively and readily reconfigurable to accommodate different combinations of parts. Inserts defining a tier subdivision are readily removed, independently of a neighboring insert.

Accordingly, it is a principal object of the invention to convert a bucket into a storage and dispensing receptacle.

It is another object of the invention to divide a converted bucket into selectively variable vertical tiers.

It is a further object of the invention to subdivide any one tier selectively into variable height compartments.

Still another object of the invention is to provide removable closures for the variable height compartments.

It is an additional object to configure the variable height compartments so as to be readily grasped by one's fingers without causing interference between the contents of the compartment and the user's fingers.

Yet another object of the invention is to provide for removably installable radially disposed partitions within at least one of the stackable containers, thereby providing for the adjustment of the volume of the stackable containers according to the desires of the user thereof.

It is an object of the invention to provide improved elements and arrangements thereof in an apparatus for the purposes described which is inexpensive, dependable and fully effective in accomplishing its intended purposes.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENTS

Figure 1:
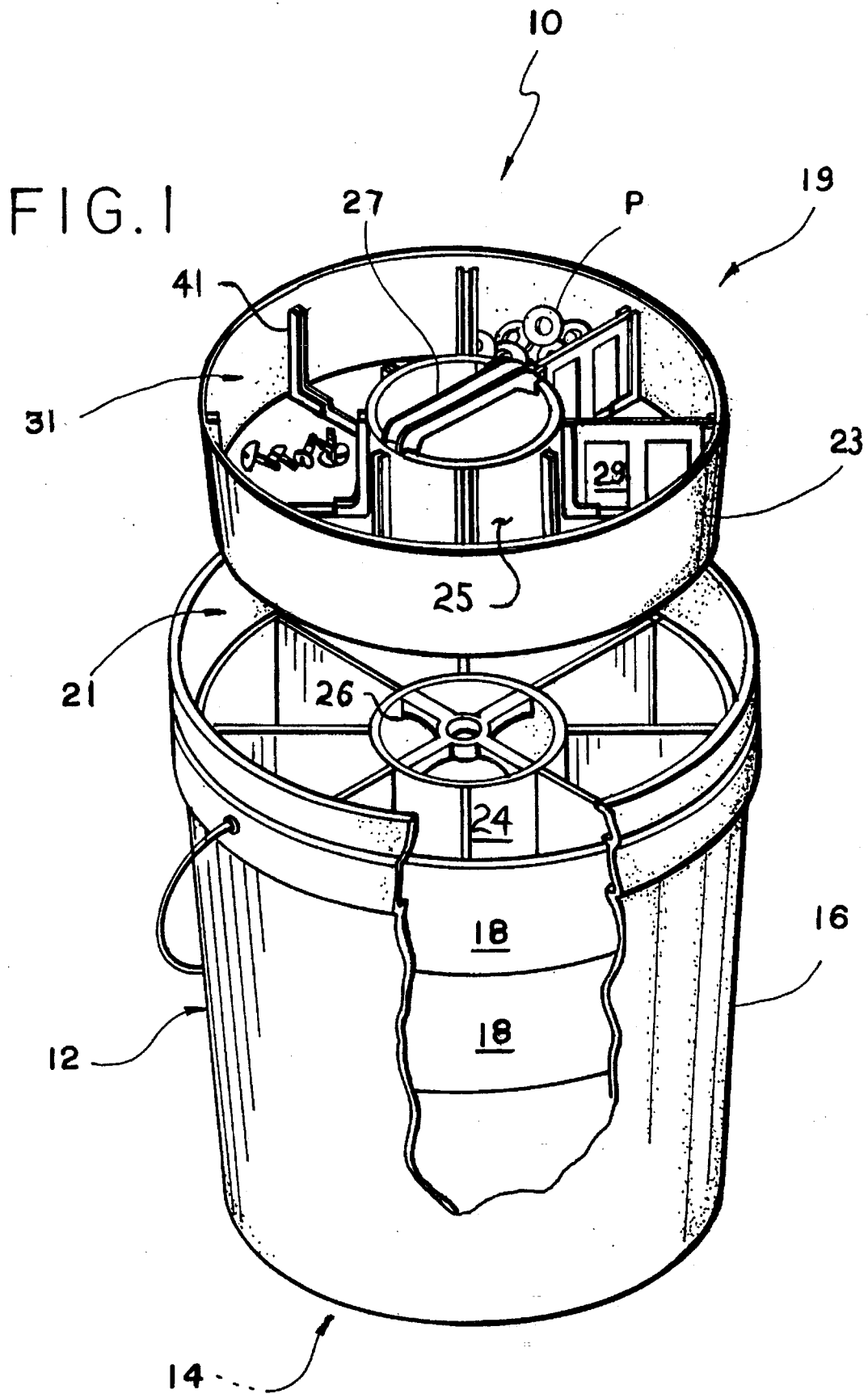
FIG. 1 is an exploded perspective view of the present invention, showing a tray removed from a bucket, the view being partially broken away to reveal internal detail (inserts normally provided are omitted for the sake of clarity in this view).

Referring now to FIG. 1 of the drawings, the present invention will be seen to relate to a bucket or the like, adapted to become a storage and dispensing receptacle 10. Receptacle 10 is very convenient for handling several types of small parts or objects P generally used in quantity, such as nails, screws, nuts, and similar fasteners, for example. A preferred bucket is provided by a general utility bucket 12, commonly available for handling bulk construction or consumer materials, having a floor or lowermost panel 14 and an upstanding, bounding wall 16.

Into bucket 12 are placed vertically stackable trays 18, each having a bottom 20 and an upstanding, perimetric wall 22. A hollow, central column 24 has handle members 26 spanning the open top of column 24. Tray 18 may thus be grasped and lifted by hand.

Alternative trays 19 (one shown removed above the lower trays 18 and bucket 12 in FIG. 1) are provided, which may be used in lieu of or in addition to the trays 18, as desired. Tray(s) 19 also include(s) a bottom or floor 21 and peripheral wall 23, in the manner of like components 20 and 22 of trays 18. However, it will be noted that the handle means 27 of the tray 19 comprises a single crossmember, which extends across the open top of the column 25 to divide the central space within the column 25 into two equal areas in a plan view. The handle 27 extends upwardly above the upper edge of the central column 25, thus providing for engagement with and fitting into the open central passage defined by the column 24/25 of a tray installed directly thereabove.

Trays 18/19 are configured generally to conform to the configuration of bucket 12, so that they fit snugly therein. Trays 18/19 therefore occupy substantially all of the area of bucket 12 when considered in plan view, but have sufficient clearance to preclude being locked therein by vacuum or friction.

Figure 2:
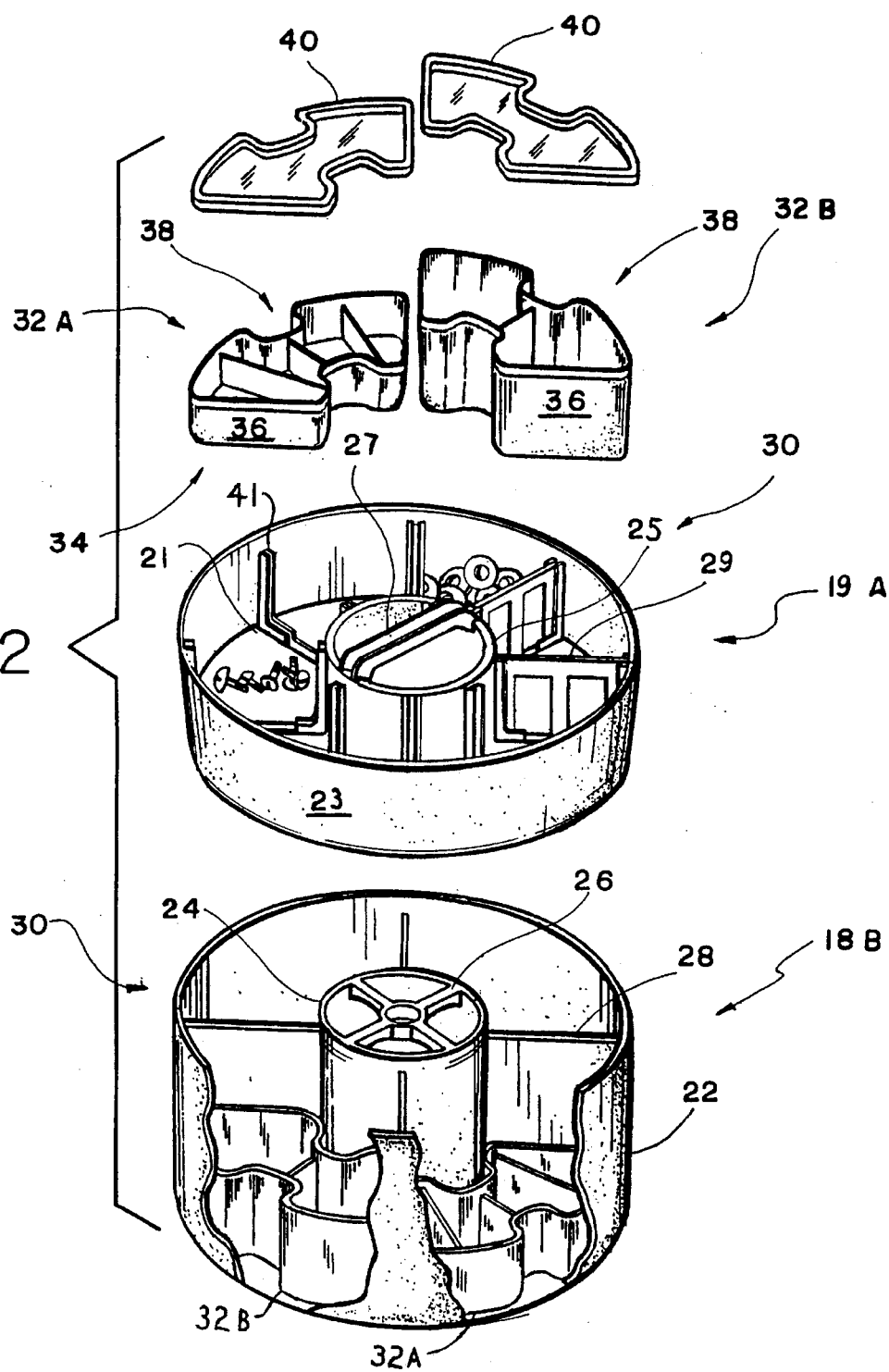
FIG. 2 is an exploded perspective view of the present trays and inserts.

Turning now to FIG. 2, trays 18/19 and associated inserts 32 will be discussed in further detail. Trays are provided in plural sizes, according to the height. Preferably, there are low trays 18A/19A (with a tray 19A being shown) and high trays 18B/19B (with a tray 18B being shown), with the height of a high tray 18B/19B equal to the combined height of two low trays 18A/19A. In all other respects, trays 18A and 18B, and alternative trays 19A and 19B, are equivalent and interchangeable.

Figure 3:
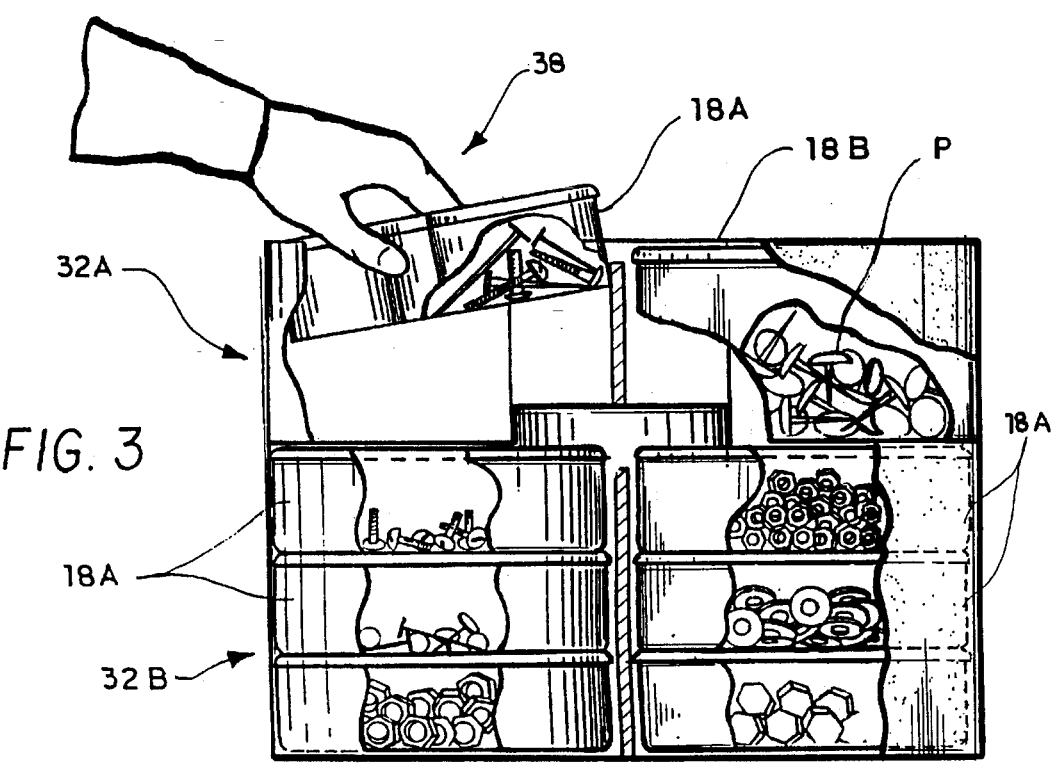
FIG. 3 is an environmental side elevational view partially broken away reveal internal detail, of an insert being removed from a tray, the view being drawn to an enlarged scale.

Compartments 30 of trays 18 are lined by inserts 32, each individually insertable into and removable from a tray 18. Each insert 32 has a floor 34 and an upstanding, outer wall 36. The wall narrows in the middle to define a constricted neck portion 38. As seen in FIG. 3, neck portion 38 provides an area which can be grasped to remove an individual insert 32 from its associated tray 18. Even if this insert 32 is filled with objects P (see FIG. 3), the neck portion 38 allows the user's fingers unobstructed access for grip. It will be noted in this figure that inserts 32 cooperate in close fitting fashion with trays 18, wherein a tray 18A of low height is stacked with a tray 18B of high height.

Again referring to FIG. 2, in the manner of trays 18, inserts 32 are also provided having variable height. An insert 32A of low height and an insert 32B of high height are illustrated. Both inserts 32A, 32B are optionally provided, in an alternative embodiment, with tightly fitting caps 40. This feature is useful in preventing spillage of insert contents and in storing perishables in receptacle 10.

Figure 4:
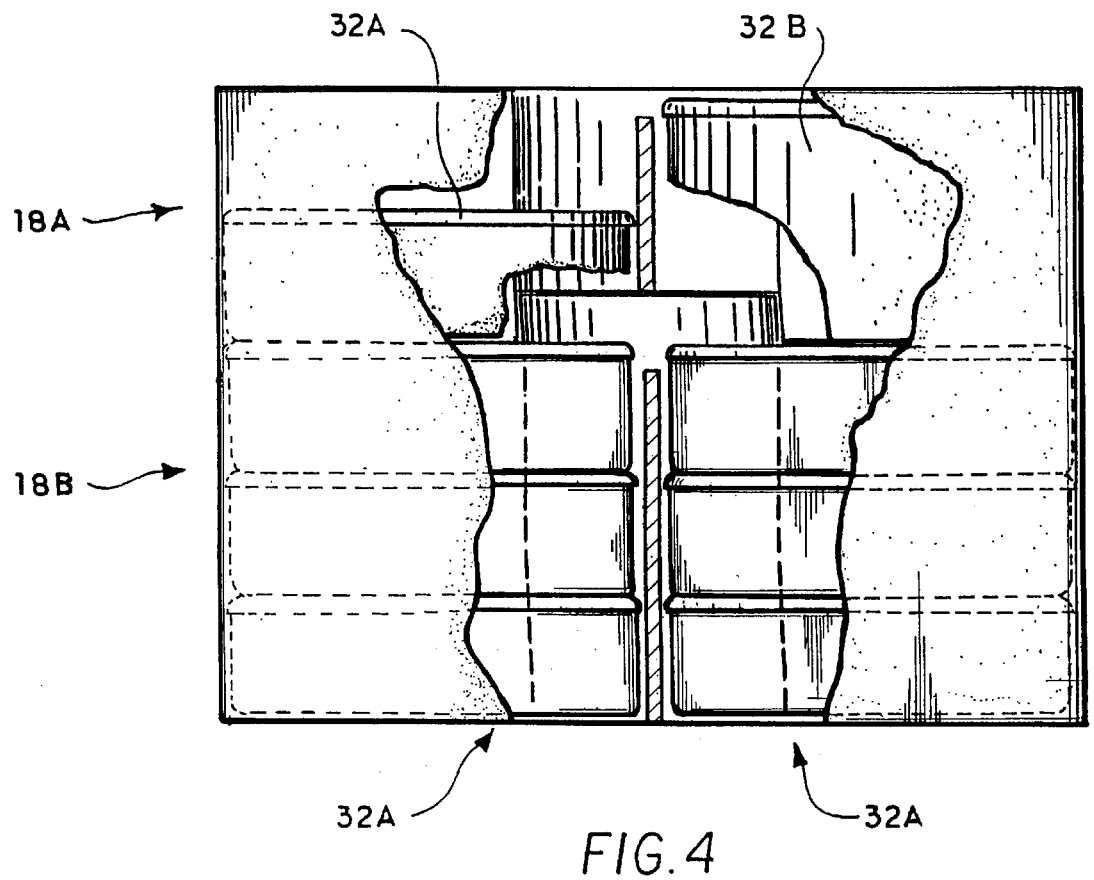
FIG. 4 is a side elevational view of two stacked trays, partially broken away to reveal inserts placed in both trays, drawn to enlarged scale.

The modular nature of receptacle 10 is best shown in FIG. 4. Tray 18B accommodates inserts 32A of low height. But tray 18A, located above, has one insert 32B of high height, and other inserts 32A of low height.

It will be noted that each of the trays 18 and 19, include plurality of radially disposed partitions, respectively 28 and 29, therein, extending between the central column 24/25 and the peripheral wall 22/23. These partitions 28/29 serve to divide the interior volume into a plurality of compartments or volumes 30/31. The partitions or divider walls 28 of trays 18 are fixed in place; hence, the compartments or volumes 30 defined thereby are fixed and cannot be enlarged or reduced in size.

However, the partitions 29 of trays 19 are removable, and may be removed from and inserted within trays 19 by means of the U-shaped channels 41 provided along the inner surface of the peripheral wall 23, across the floor or bottom 21, and up the side of the central column 25. The peripheral edges 43 of the removable partitions 29 have a thickness adapted to fit closely within the generally U-shaped cross section of the channels 41, so as to be retained therein.

Each of the removable partitions 29 may also include a central spine 45 of like thickness to that of the edges 43, if desired, for additional strength. However, two relatively thinner panels 47 may be disposed one to each side of the central spine 45, if desired, in order to provide slightly greater interior volume for a tray 19

Figure 5:
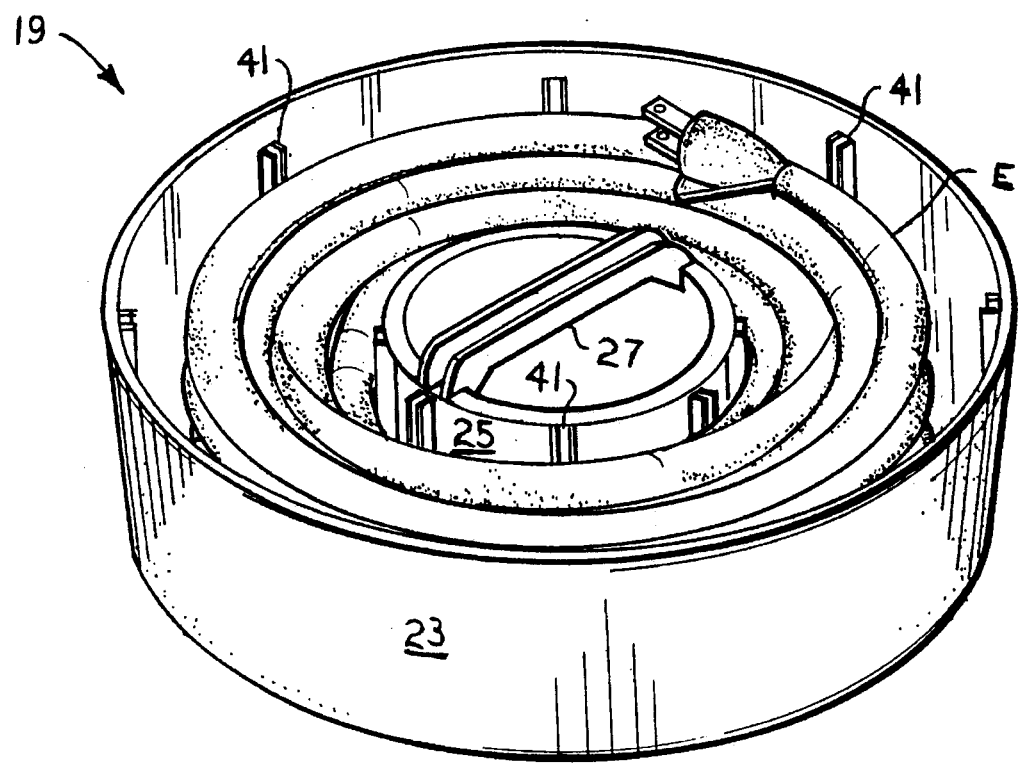
FIG. 5 is a perspective view of an alternate tray having removably Insertable radially disposed partitions, showing the partitions removed and providing for use of the tray for the storage of elongate coiled articles therein.

FIGS. 1 and 2 each show at least one tray 19 having removably insertable partitions 29 therein, being used in combination with the other types of trays 18A and/or 18B. In FIG. 5, a single tray 19 is shown, with all of the partitions 29 removed therefrom in order to provide a single, continuous toroidally shaped interior volume 31 between the peripheral wall 23 and the central column 25. Such a tray configuration is quite valuable in the construction industry and other trades, for the carriage of various types of elongate articles E, such as extension cords, surveying tapes, plumb lines, hoses, etc., as desired. The tray 19 with its removably installable partitions 29, will be seen to add greatly to the versatility provided by the present invention.

Thus, it will be seen that the improvements disclosed herein add several dimensions to the partitioning of bucket 12 or other receptacle. Removable trays 18/19 divide the bucket 12 vertically into tiers, which are selectively variable as to height. Inserts 32 subdivide each tier into self-contained, individually removable, adjacent compartments. Both trays 18/19 and inserts 32 include means for grasping and removing, even when the tray or insert is filled with objects. Inserts 32 may be used in combination with trays 19 having removable partitions 29, in addition to trays 18 having fixed partitions 28.

While the arrangement of trays 18/19 and inserts 32 has been illustrated in one particular way, many combinations of lateral and vertical spacing are enabled. For example, a user may select only low or only high trays and inserts. High trays may be placed either above or below low trays. Similarly, any one particular tray may be provided with high or low inserts regardless of the trays' order.

It is to be understood that the present invention is not limited to the sole embodiment described above, but encompasses any and all embodiments within the scope of the following claims.

I claim:

1. A storage container comprising:

a bucket;

a plurality of vertically stackable trays, with each of said trays having a configuration conforming to the configuration of said bucket for insertion and is inserted thereinto;

at least one of said trays including a plurality of partitions removably inserted therein and adapted to divide said at least one of said trays into a plurality of selectably variable volumes, and;

a plurality of inserts removably inserted into said trays, each of said plurality of inserts having a floor;

each of said inserts including means dimensioned and configured to have a constricted neck portion, said constricted neck portion extending to said floor;

each of said inserts further being dimensioned and configured to cooperate with other said inserts such that at least two of said inserts are insertable into any one said tray, whereby;

said bucket is vertically divided into tiers, and each tier is subdivided into adjacent compartments.

2. The storage container of claim 1, wherein:

each of said removably inserted partitions comprises a relatively thicker peripheral edge and central spine, with two spaced apart relatively thinner panels disposed to each side of said central spine, thereby providing structural strength by means of said relatively thicker peripheral edge and central spine and further providing greater interior volume within said at least one of said trays by means of said relatively thinner panels.

3. The storage container according to claim 1, wherein:

each of said inserts has a tightly fitting cap.

4. The storage container according to claim 1, wherein:

each of said trays has a central column having a wall which defines a hollow center, with a handle spanning said central column across said hollow center, whereby;

said trays are readily grasped and lifted by hand.

5. The storage container of claim 4, wherein:

said hollow center of said each of said trays defines a central passage therethrough, and;

said handle comprises a single crossmember immovably affixed to said central column wall and arching thereacross to extend above said central column wall and divide said hollow center of said each of said trays generally into two equal portions when viewed from above, with at least one said handle extending upwardly into said central passage of at least one of said trays stacked thereabove.

6. A partitioning arrangement for a storage and dispensing receptacle, comprising:

a bucket;

a plurality of vertically stackable trays, with each of said trays having a bottom, an upstanding perimetric wall, and a configuration conforming to the configuration of said bucket for insertion and is inserted thereinto;

each of said trays further having a height dimension, with at least one of said trays having a low said height dimension and at least one of said trays having a high said height dimension, wherein said bucket holds said trays;

at least one of said trays including a plurality of partitions removably inserted therein and adapted to divide said at least one of said trays into a plurality of selectably variable volumes, and;

a plurality of inserts removably inserted into said trays, with each of said inserts having a floor and an upstanding outer wall;

each of said inserts including means dimensioned and configured to have a constricted neck portion, whereby;

said constricted neck portion provides unobstructed access for gripping by a user's fingers;

each of said inserts further being dimensioned and configured to cooperate with other said inserts such that at least two of said inserts are insertable into any one said tray, whereby;

said bucket is vertically divided into tiers, and each tier is subdivided into adjacent compartments.

7. The partitioning arrangement according to claim 6, wherein:

each of said inserts has a height dimension, with at least one of said inserts having a low said height dimension and at least one of said inserts having a high said height dimension, and two said inserts having a low said height dimension have a combined height dimension equal to said height dimension of said insert having a high height dimension, whereby;

any one of said trays holds at least two of said inserts.

8. The partitioning arrangement according to claim 6, wherein:

two said trays having a low said height dimension have a combined height dimension equal to said height dimension of said tray having a high said height dimension.

9. The partitioning arrangement of claim 6, wherein:

each of said removably inserted partitions comprises a relatively thicker peripheral edge and central spine, with two spaced apart relatively thinner panels disposed to each side of said central spine, thereby providing structural strength by means of said relatively thicker peripheral edge and central spine and further providing greater interior volume within said at least one of said trays by means of said relatively thinner panels.

10. The partitioning arrangement according to claim 6, wherein:

each of said inserts has a tightly fitting cap.

11. The partitioning arrangement according to claim 6, wherein:

each of said trays has a central column having a wall which defines a hollow center, with a handle spanning said central column across said hollow center, whereby;

said trays are readily grasped and lifted by hand.

12. The partitioning arrangement of claim 11, wherein:

said hollow center of said each of said trays defines a central passage therethrough, and;

said handle comprises a single crossmember immovably affixed to said central column wall and arching thereacross to extend above said central column wall and divide said hollow center of said each of said trays generally into two equal portions when viewed from above, with at least one said handle extending upwardly into said central passage of at least one of said trays stacked thereabove.

13. A partitioning arrangement for a storage and dispensing receptacle, comprising:

a bucket;

a plurality of vertically stackable trays, with each of said trays having a bottom, an upstanding perimetric wall, and a configuration conforming to the configuration of said bucket for insertion and is inserted thereinto;

each of said trays further having a height dimension, with at least one of said trays having a low said height dimension and at least one of said trays having a high said height dimension, wherein said bucket holds said trays;

at least one of said trays including a plurality of partitions removably inserted therein and adapted to divide said at least one of said trays into a plurality of selectably variable volumes, and;

a plurality of inserts removably inserted into said trays, with each of said inserts having a floor and an upstanding outer wall;

each of said inserts having a height dimension, with at least one of said inserts having a low said height dimension and at least one of said inserts having a high said height dimension, and two of said inserts having a low said height dimension have a combined height dimension equal to said height dimension of said insert having a high height dimension;

each of said inserts further being dimensioned and configured to cooperate with other said inserts such that at least two of said inserts are insertable into any one said tray, whereby;

said bucket is vertically divided into tiers, and each tier is subdivided into adjacent compartments.

14. The partitioning arrangement according to claim 13, wherein:

two said trays having a low said height dimension have a combined height dimension equal to said height dimension of said tray having a high said height dimension.

15. The partitioning arrangement of claim 13, wherein:

each of said removably inserted partitions comprises a relatively thicker peripheral edge and central spine, with two spaced apart relatively thinner panels disposed to each side of said central spine, thereby providing structural strength by means of said relatively thicker peripheral edge and central spine and further providing greater interior volume within said at least one of said trays by means of said relatively thinner panels.

16. The partitioning arrangement according to claim 13, wherein:

each of said inserts has a tightly fitting cap.

17. The partitioning arrangement according to claim 13, wherein:

each of said trays has a central column having a wall which defines a hollow center, with a handle spanning said central column across said hollow center, whereby;

said trays are readily grasped and lifted by hand.

18. The partitioning arrangement of claim 17, wherein:

said hollow center of said each of said trays defines a central passage therethrough, and;

said handle comprises a single crossmember immovably affixed to said central column wall and arching thereacross to extend above said central column wall and divide said hollow center of said each of said trays generally into two equal portions when viewed from above, with at least one said handle extending upwardly into said central passage of at least one of said trays stacked thereabove.

19. A partitioning arrangement for a storage and dispensing receptacle, comprising:

a bucket;

a plurality of vertically stackable trays, with each of said trays having a bottom, an upstanding perimetric wall, and a configuration conforming to the configuration of said bucket for insertion and is inserted thereinto;

each of said trays further having a height dimension, with at least one of said trays having a low said height dimension and at least one of said trays having a high said height dimension, wherein said bucket holds said trays;

at least one of said trays including a plurality of partitions removably inserted therein and adapted to divide said at least one of said trays into a plurality of selectably variable volumes, each of said partitions comprising a relatively thicker peripheral edge and central spine, with two spaced apart relatively thinner panels disposed to each side of said central spine, thereby providing structural strength by means of said relatively thicker peripheral edge and central spine and providing greater interior volume within said at least one of said trays by means of said relatively thinner panels, and;

a plurality of inserts removably inserted into said trays, with each of said inserts having a floor and an upstanding outer wall;

each of said inserts further being dimensioned and configured to cooperate with other said inserts such that at least two of said inserts are insertable into any one said tray, whereby;

said bucket is vertically divided into tiers, and each tier is subdivided into adjacent compartments.

20. The partitioning arrangement according to claim 19, wherein:

each of said trays has a central column having a wall which defines a hollow center, with a handle spanning said central column across said hollow center, whereby;

said trays are readily grasped and lifted by hand.

* * * * *